United States Patent [19]

Corpron

[11] Patent Number: 5,247,837
[45] Date of Patent: Sep. 28, 1993

[54] MAGNETIC FLOWMETER ELECTRODE

[75] Inventor: Gary P. Corpron, Chanhassen, Minn.

[73] Assignee: Rosemount Inc., Eden Prairie, Minn.

[21] Appl. No.: 765,556

[22] Filed: Sep. 25, 1991

[51] Int. Cl.$^5$ ............................................. G01F 1/58
[52] U.S. Cl. ............................ 73/861.12; 73/861.11
[58] Field of Search ..................... 73/861.11, 861.12; 310/11

[56] References Cited

U.S. PATENT DOCUMENTS

| | | | |
|---|---|---|---|
| 4,741,215 | 5/1988 | Bohn et al. | 73/861.12 |
| 4,782,709 | 11/1988 | Goto et al. | 73/861.12 |
| 4,912,838 | 4/1990 | Goto et al. | 29/602.1 |

FOREIGN PATENT DOCUMENTS

| | | |
|---|---|---|
| 3344679 | 6/1985 | Fed. Rep. of Germany . |
| 59-78924 | 5/1984 | Japan . |
| 0137520 | 6/1987 | Japan ............................. 73/861.12 |
| 2068122 | 8/1981 | United Kingdom ............ 73/861.12 |

*Primary Examiner*—Herbert Goldstein
*Assistant Examiner*—Elizabeth L. Dougherty
*Attorney, Agent, or Firm*—Kinney & Lange

[57] ABSTRACT

The flow tube of a ceramic material used for a magnetic flowmeter is formed with electrodes that are positioned in the wall of the tube and form a fluid tight fitting. The electrodes have a center plug made of a ceramic material with a metallization layer between the plug and the surface of the opening in the flow tube. The inner ends of the plugs are covered with a conductive ceramic electrode layer that electrically joins the metallization on the plugs to couple the EMF generated by the flowing fluid to the exterior of the flow tube. The conductive ceramic layer is engaged by the fluid in the flowmeter to protect the metallization from erosion. The electrodes are connected to suitable circuitry on their exterior ends.

15 Claims, 2 Drawing Sheets

MAGNETIC FLOWMETER ELECTRODE

BACKGROUND OF THE INVENTION

The present invention relates to an electrode for a ceramic flow tube used in a magnetic flow meter, and which provides for high resistance to abrasion or erosion by the flowing fluid and which can be made in a manner to remain fluid tight.

Magnetic flowmeter electrodes are a source of continuing development in magnetic flowmeters using a ceramic flow tube. In prior art devices, a ceramic flow tube is formed and then electrodes of various kinds are placed into the wall of the tube. Sintering fixes the electrodes in place, but the ability to obtain leak tight electrodes plagues designers. In some instances, in the sintering of the measuring pipe with the electrodes in place in bores in the tube wall, the electrode material will not withstand the sintering temperature of ceramics, or will have a different thermal co-efficient from ceramics. Platinum electrode materials are used, as well as conductive ceramic materials. Electrodes using a ceramic core rod having a conductive portion of a refractory metal that covers the fluid contact end face of the rod and extends outward on the rod so that it can be connected to a lead, have been advanced as well. The use of metal coatings on ceramic rods solves some problems of sintering the materials in place, but there still are problems of erosion of the faces that are in contact with the fluid flowing through the flow tube.

SUMMARY OF THE INVENTION

The present invention relates to an electromagnetic fluid flowmeter having a ceramic flow tube that carries the fluid to be measured past electrodes, in the presence of an electromagnetic field. The flowing fluid induces an EMF that is sensed by the electrodes in a known manner. The electrodes comprise ceramic plugs coated with a metal, conductive coating, and tightly fitted in openings formed in the side walls of the tube in diametrically opposed positions. An electrode layer of a conductive ceramic material, such as a platinum-alumina material, is formed over the end of the ceramic plug or rod in conductive relation to the metallized coating on the plug, and is positioned to be in contact with the flowing fluid through the openings in the tube. The conductive electrode layer is highly resistant to abrasion or erosion and protects the metallized layer from erosion by the flowing fluid.

The metallization preferably is on selected periphery surfaces of the plug to ensure a low impedance connection between the conductive ceramic electrode layer and the metallization on the plug.

The invention provides for a reliably insertable electrode with low impedance, and one which is capable of being sintered tightly in place in openings on the flow tube.

The metallization can be a platinum paste that is put over a preformed, dimensionally stable ceramic plug that is close to the thermal expansion properties of the flow tube material. The conductive ceramic electrode end, forming the fluid contact face of the electrode in the preferred form of the invention, can be compressed in a cylindrical die. Alumina can then be compressed behind the conductive end to form a green electrode plug. The plug can then be removed from the die and fired. The fired plug, including the conductive ceramic end, can then be coated with the metal paste and slipped in the bore in the wall of a green flow tube. The assembly can then be fired or sintered to seal the electrode in place.

DETAILED DESCRIPTION OF THE PREFERRED EMBODIMENTS

Figure 1:
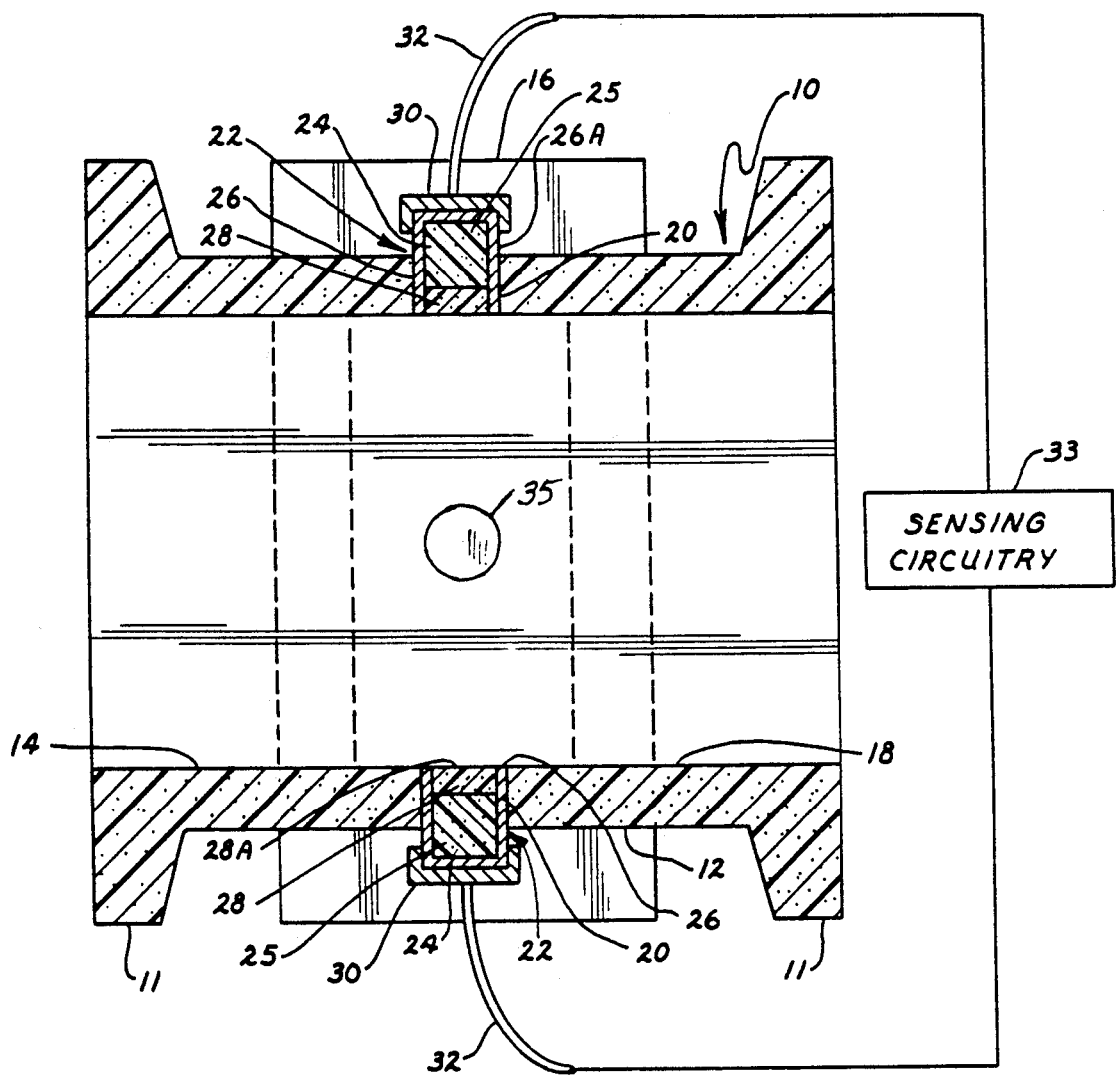
FIG. 1 is a cross sectional view of a typical ceramic flow tube having electrodes made according to a preferred embodiment of the present invention installed thereon.
Figure 2:
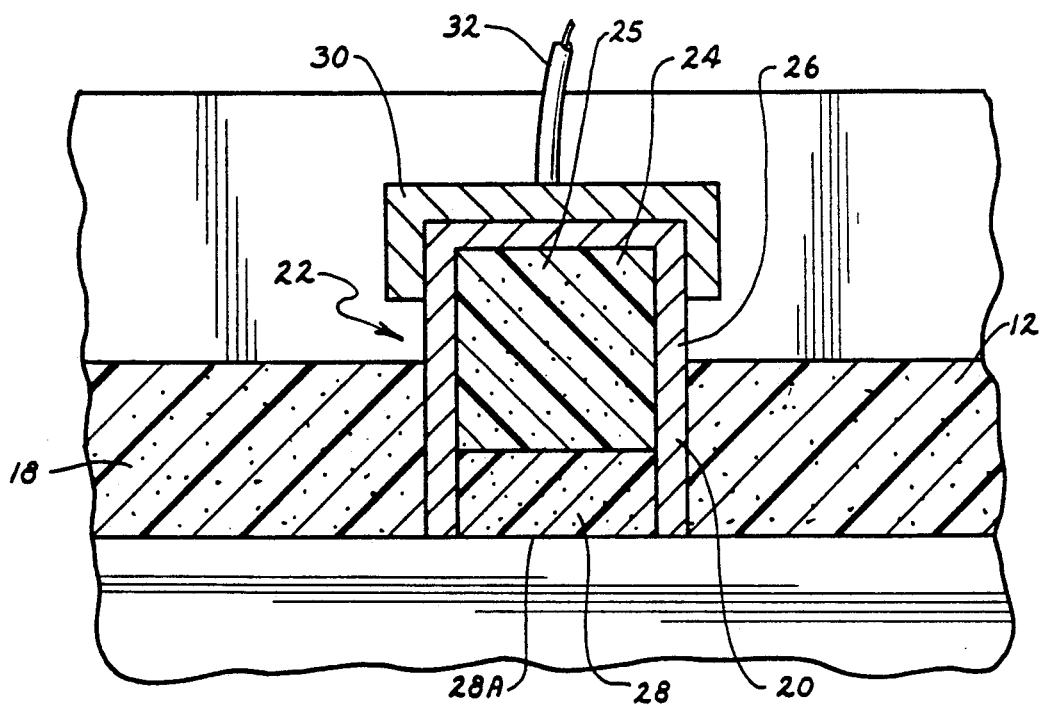
FIG. 2 is an enlarged view of an electrode end portion of the flow tube shown in FIG. 1.

FIG. 1 illustrates a ceramic flow tube 10 forming a flowmeter used in a flow pipe to measure flow of a fluid carried in the pipe. The ceramic flow tube 10 has connecting flanges 11 at its opposite ends, and a central flow tube section 12. A through bore (defined by an interior surface) indicated at 14 carries the fluid within the ceramic flow tube. The flow connections can be made in any desired manner and are well known. An excitation coil 16 for establishing a magnetic field in the flow tube is shown only schematically adjacent to the section 12.

The tube 10 is made of a ceramic material selected for obtaining the necessary abrasive resistant and chemical resistant properties to withstand the fluid flow action and capable of being formed in conventional processes. The ceramic material typically will be alumina ($Al_2O_3$) which is substantially neither electrically conductive nor highly magnetically permeable. The particle size of the ceramic material is chosen to provide strength, abrasion resistance, and other desired properties. Typically, two microns or smaller size particles are desired, for this will tend to optimize strength and density of the finished part. High purity alumina particles in the range of 95.5% or higher purity alumina, are used. Fiber-reinforced ceramic may also be used for improved strength. Other substantially chemically inert, non-conductive, low permeability, pressure bearing materials may also be used.

The wall 18 of the ceramic flow tube center section 12 is provided with bores 20, 20 on opposite sides thereof which are diametrically opposed, and which are used for housing electrodes indicated at 22, 22. The electrodes 22, 22 as shown are formed using a central, pre-fired ceramic rod or plug 24, covered with a conductive metallization layer 26, which is formed on sides of the plug 24. The plugs 24 each have a portion 25 which is made of the same ceramic material as the flow tube so the materials have the same thermal expansion properties when sintered.

The electrodes 22, 22 each include a conductive ceramic electrode layer or disk 28 forming, as shown, a part of plug 24. The ceramic material forming the electrode layer 28 is made to be suitably electrically conductive and magnetically permeable. The electrode layer 28 is electrically coupled or connected to the metallization layer 26 at the periphery of the disk 28 of the ceramic plug 24.

The metallization can be a platinum paste that is put over the preformed, dimensionally stable ceramic plug 24 that is close to the thermal expansion properties of the flow tube material. The conductive ceramic electrode end disk, 28 forming the fluid contact face of the electrode 22 in the preferred form of the invention, can be compressed in a cylindrical die. Alumina can then be compressed behind the conductive ceramic end disk 28 to form a green electrode plug. The plug can then be removed from the die and fired or sintered. The fired plug 24, including the conductive ceramic end 28, can then be coated with the metal paste and slipped in the bore in the wall of a green flow tube.

After placing the preformed electrodes 22 in the flow tube and sintering the assembly, as will be explained, a conductive cap 30 is brazed or soldered to the metallization layer 26 to form an electrical connection on the exterior portion of each of the electrodes 22. A suitable lead 32 is connected to each cap 30 and leads to suitable sensing circuitry 33. This circuitry also can be used for providing the excitation current through the excitation coils or source 16. An electromotive force or EMF is generated in proportion to the fluid flow and the EMF will be measured across the leads 32.

The flow tube 10, in one example, is formed by placing ceramic powder, which has been premixed with suitable binders and lubricant, so that it flows freely, into a suitable die. Sufficient pressure, such as isostatic pressure, is then applied to achieve compaction of the material. Isostatic pressure is a common way of forming ceramic materials in that it applies pressure to the powder on all sides to reduce the problems of non-uniformity. After compaction, the flow tube is in a green state and is relatively fragile and consists of compacted, loosely bonded powder. If handled carefully, the tube is strong enough to be removed from the die and machined using conventional lathe and cutting tools, if carefully controlled to avoid overstressing the powdered ceramic material. During machining, care should also be taken to avoid producing chips, cracks, breakage or porous surfaces. Any machining should account for shrinkage during final firing and densification.

The wall 18 of the flow tube is then provided with the bores 20 after the flowmeter tube has been formed in a green state. If desired, a bisque firing may be performed on the green tube to stiffen the structure slightly and provide an outer harder layer. This will reduce the risk of damage during further handling. Once the bores 20 have been made, and the electrodes are to be inserted, the pre-fired, thus hardened ceramic plug 24 of the respective electrode, which is then dimensionally stable and rigid, is coated with a metallizing paste, in one example containing platinum, in the desired regions of the plug and to a desired thickness. The cross sectional views shown herein exaggerate the thickness of the metallization layer, which in addition to platinum can be of other metals that are capable of being sintered in and will conduct electricity well. In flowmeter tubes requiring only low temperature sintering, other conductive metals can be used. However, in high temperature sintered ceramic tubes, platinum pastes are desirable.

The pre-sintered and dimensionally stable plug 24 is coated with the metal paste and inserted into the bores 20 in a desired orientation after green forming, so that a sensing surface indicated at 28A, is substantially flush or slightly recessed with respect to the inner surface of the ceramic flow tube wall 18. The ceramic disk portion 28 is made of a conductive ceramic, which can be a platinum-alumina mixture, or which may be a ceramic material containing particles of other materials that are capable of conducting electricity and are compatible with the ceramic materials.

When both of the electrodes 22 are in place, in the respective bores 20, the entire flow tube 10 can then be sintered. Sintering ensures that there is a fluid tight seal between the surfaces of the bores 20 and surfaces of the plugs 24 including the conductive ceramic disks or layers 28. The metallization layer 26 can aid in making the seal. After sintering, connection can be made to caps 30 and leads 32, or leads 32 can be bonded directly in place on the electrode by brazing, soldering or the like. Additionally, the flow tube interior bore can be ground or machined to its finished size.

As can be seen in figures and 2, the conductive ceramic layer 28 is electrically coupled or joined to the metallized layer 26 around its periphery so that there is a good electrical contact made between the conductive ceramic layer or disk 28 and the metallized layer 26. The conductive ceramic layer 28 is hard and resists abrasion by fluids flowing through the bore of the flow tube 10. The disk 28 prevents the wearing away of the electrodes and only a small rim of a soft metallized layer 26 is exposed. Metal layers are very thin and are easily eroded away unless protected. In other words, if the inner end of a ceramic plug is left with a metallized layer exposed to the flowing fluid, the metallized material will erode away, leaving only the peripheral edge of an extremely thin metallization on the sidewall to contact the fluid. Since electrode impedance is inversely proportional to the conductive surface area contacting the fluid, reduction of the conductive surface area increases the impedance of the electrode from the desired low impedance value. In the present invention, the electrical connection between the metallization layer 26 and the conductive ceramic layer 28 is not broken open by erosion. The conductive ceramic layer 28 protects the metallization layer 26 from substantial erosion, and therefore, protects the electrode from premature failure.

Figure 3:
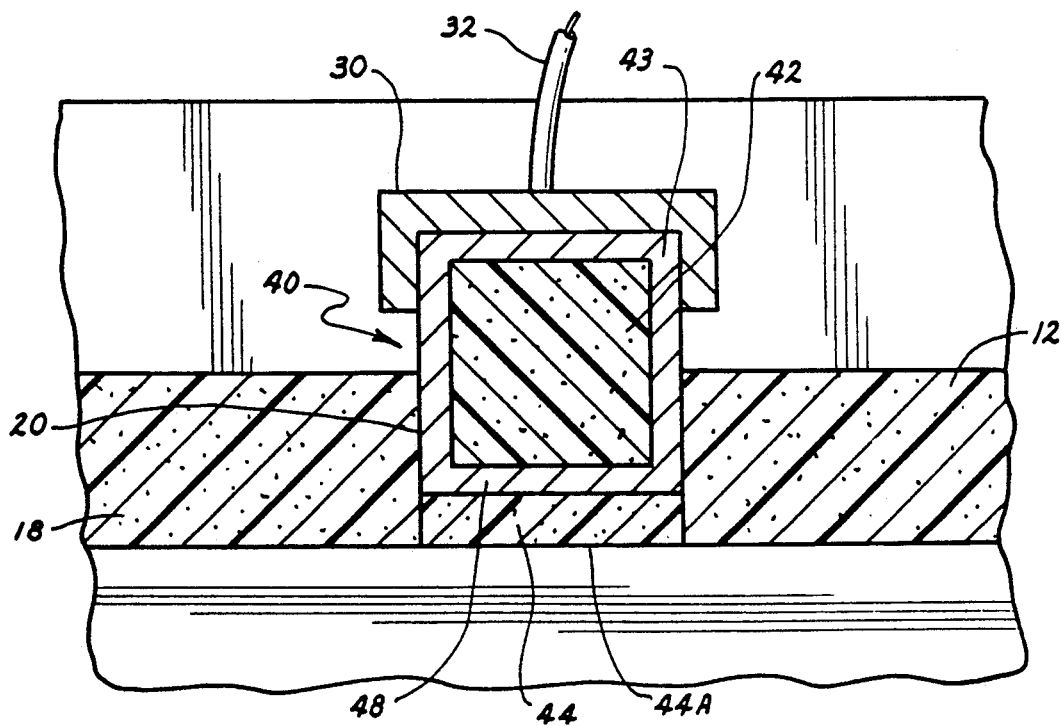
FIG. 3 is an enlarged fragmentary sectional view of a modified electrode embodying the present invention.

A modified form of electrode of the present invention, is shown in FIG. 3 and comprises an electrode 40 fitted into the bore 20 of the wall 18 of flow tube section 12. A central pre-fired ceramic plug 42 is used in this instance and is coated with a conductive metallized layer 43 on the sides and ends of the plug. The plug 42 will be made of a material matching the thermal expansion properties of the flow tube material. A conductive ceramic electrode layer or disk 44 is electrically coupled or connected to the metallized layer 48 at the inner end of the plug 42. The conductive ceramic disk has an end surface 44A that faces the interior of the flow tube and thus is subjected to the abrasive flowing fluids. The conductive ceramic disk 44 also is made of material that matches the thermal expansion properties of the flow tube material. The assembly of the plug 42, the metallized layer 43 and the conductive electrode disk or layer 44 can be assembled prior to slipping the electrode assembly into the bore 20 and subsequently firing. When fired, the metallized layer 43 will provide for electrical connections from the conductive ceramic layer 44 to a cap 30 and lead 32 that are connected on the exterior end of the electrode 40 in a conventional manner, as shown. The electrical connection between the conductive ceramic electrode layer 44 and the metallized layer 43 is at the interface surface of conductive ceramic layer 44 and layer portion 48 in this form of the invention. The fluid acts on the exposed end of the abrasive resistant conductive ceramic disk 44 so the metallized layer is protected. The electrical connection between the ceramic conductive layer 44 and the metallized layer 43 is not degraded by erosion from the fluid. The conductive ceramic layer 44 thus provides protection for the metallized layer portion 48.

In both forms of the invention, the conductive ceramic layer or disk is used for taking the majority of the abrasive action of fluid on the electrode area, and therefore protects the metallized layer from the abrasion of the fluid flowing through the tube. With the metallization layers protected, the desired low impedance conductive path will be maintained, ensuring that the leads will sense an electromotive force (EMF) induced by a flowing fluid in the magnetic field provided by the schematically shown coil 16. This EMF will be carried by the metallization layers from the conductive ceramic layer at the end of the electrode.

Various cross sectional configurations of the bores 20 can be made, and the ceramic plugs used in both forms of the invention will be made to match the shape of such bores.

The use of conductive ceramics and forming of ceramic flow tubes with various compositions, as well as the operations of flow tubes is discussed in U.S. Pat. No. 4,741,215.

A third grounding electrode may be included as shown schematically in FIG. 1 at 35. The grounding electrode is constructed in the same manner as the measurement electrodes 22 and 40. This grounding electrode 35 is used in the sensing circuitry for electrical grounding.

Although the present invention has been described with reference to preferred embodiments, workers skilled in the art will recognize that changes may be made in form and detail without departing from the spirit and scope of the invention.

What is claimed is:

1. A fluid flowmeter, comprising:
   means for generating a magnetic field and for sensing an EMF induced by fluid flowing through the magnetic field and providing an output representative of the flow as a function of the sensed EMF;
   a ceramic flow tube receiving the magnetic field and formed of a ceramic material impermeable to the fluid flowing through the flow tube, the ceramic flow tube having openings for receiving EMF sensing electrodes, the openings extending between inner and outer walls of the ceramic flow tube;
   ceramic plugs formed of a ceramic material impermeable to the fluid and shaped to fit tightly in each opening to seal the openings for receiving the sensing electrodes and each ceramic plug having an inner plug surface adjacent the inner wall of the ceramic flow tube and an outer plug surface near the outer wall of the ceramic flow tube;
   a metallization formed on each ceramic plug, the metallization extending between the inner plug surface and the outer plug surface between the ceramic plug and the opening, the metallization coupling EMF induced by the fluid to the sensing means;
   an electrode layer formed adjacent and in electrical contact with the metallization on the inner plug surface for providing electrode contact with the fluid, the electrode layer comprising an electrically conductive ceramic material which protects the metallization from erosion by the flowing fluid, the conductive ceramic material having thermal expansion characteristics which match the thermal expansion characteristics of the flow tube.

2. The fluid flowmeter according to claim 1 wherein the metallization formed on each ceramic plug extends around the sides of the ceramic plug between the ceramic plug and the opening, and around the periphery of the electrode layer to the inner plug surface.

3. The fluid flowmeter according to claim 1 and an electrically conductive cap bonded to each outer plug surface.

4. The fluid flowmeter according to claim 1 wherein the ceramic plugs are made of ceramic materials matching the thermal expansion characteristics of the ceramic material forming the flow tube.

5. The fluid flowmeter according to claim 1 wherein the ceramic plugs are coated on all surfaces with the metallization, including the inner plug surfaces, said electrode layer of each plug joining the metallization on said inner plug surface of the respective ceramic plug across a substantial surface area, and completely shielding the inner plug surface of the metallized plug from the fluid when in place in the flow tube.

6. The fluid flowmeter of claim 5 wherein the plug is made of ceramic materials matching the thermal expansion characteristics of the ceramic material forming the flow tube.

7. The fluid flowmeter according to claim 5 wherein the outer plug surface of each ceramic plug is above an outer surface of the flow tube outer wall, and the metallization layer is exposed on the outwardly extending outer ends of the plugs, and a cap for each plug which at least partially surrounds an end of the respective plug electrically is connected to the metallization layer on the plug, said cap being electrically conductive and having a lead attached thereto.

8. The fluid flowmeter according to claim 1 wherein the ceramic material forming each electrode layer includes a filling of platinum particles and matches the thermal expansion characteristics of the ceramic materials forming the plug.

9. The fluid flowmeter according to claim 1 wherein an assembly of the electrode layer and the plug are pre-fired together to form a unit which is inserted into the openings in the ceramic flow tube while the ceramic flow tube is in a green state.

10. The fluid flowmeter according to claim 9, wherein said metallization comprises a platinum paste placed around the sides of the ceramic pre-fired plug and the periphery of the electrode layer prior to the plug being positioned in the opening of the flow tube.

11. The flow sensing device according to claim 1 wherein one of said electrodes is a grounding electrode.

12. A fluid flow sensing device comprising:
   a ceramic flow tube for receiving a magnetic field and formed of a ceramic material impermeable to a fluid flowing through the flow tube, the ceramic flow tube having a wall defining a center bore carrying fluid flow, the wall having openings for receiving EMF sensing electrodes;
   the electrodes comprising ceramic plugs formed of a ceramic material and a layer of electrically conductive ceramic material at a portion of the electrode opening to the bore and shaped to fit tightly in each opening to seal the openings for receiving the sensing electrodes, the ceramic plugs and conductive ceramic layers both having thermal expansion characteristics which substantially match the thermal expansion characteristics of the ceramic flow tube; and a metallization formed on each ceramic plug, the metallization extending between the conductive ceramic layer and an outer plug surface to an exterior of the flow tube, the conductive ceramic layer being free of metallization on a surface thereof opening to the bore, the conductive ceramic layer protecting the metallization from substantial erosion cause by fluid flowing past the electrodes.

13. The flow sensing device according to claim 12, wherein a portion of the metallization is positioned between the conductive ceramic layer and an end of the plug adjacent the bore of the flow tube, the conductive ceramic layer having a periphery that engages and seals directly on surfaces defining the openings in the wall of the flow tube.

14. The flow sensing device according to claim 12 including an assembly of the electrode layer and the plug to form a unit the metallization being on the periphery of the unit.

15. The flow sensing device of claim 12 wherein one of said electrodes is a grounding electrode.

* * * * *

UNITED STATES PATENT AND TRADEMARK OFFICE
CERTIFICATE OF CORRECTION

PATENT NO. : 5,247,837
DATED : September 28, 1993
INVENTOR(S) : Corpron

It is certified that error appears in the above-indentified patent and that said Letters Patent is hereby corrected as shown below:

Col. 4, line 12, after "figures" insert --1--.

Col. 8, line 7, after "unit" insert --,--.

Signed and Sealed this

Twenty-sixth Day of July, 1994

Attest:

BRUCE LEHMAN

*Attesting Officer*     *Commissioner of Patents and Trademarks*